US008271589B2

(12) United States Patent  
Phillips et al.

(10) Patent No.: US 8,271,589 B2  
(45) Date of Patent: Sep. 18, 2012

(54) MAIL LIST EXCEPTIONS

(75) Inventors: Daja Phillips, Palo Alto, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 1492 days.

(21) Appl. No.: 11/026,183

(22) Filed: Dec. 29, 2004

(65) Prior Publication Data

US 2006/0143276 A1    Jun. 29, 2006

(51) Int. Cl.  
G06F 15/16  (2006.01)

(52) U.S. Cl. ........................................................ 709/206

(58) Field of Classification Search .................. 709/206  
See application file for complete search history.

(56) References Cited

U.S. PATENT DOCUMENTS

| | | | | |
|---|---|---|---|---|
| 5,826,022 A * | 10/1998 | Nielsen | ........................ | 709/206 |
| 5,864,684 A * | 1/1999 | Nielsen | ........................ | 709/206 |
| 6,704,772 B1 * | 3/2004 | Ahmed et al. | ................ | 709/207 |
| 6,721,785 B1 * | 4/2004 | Raghunandan | ............... | 709/206 |
| 7,454,195 B2 * | 11/2008 | Lewis et al. | ................ | 455/412.1 |
| 2002/0099777 A1 * | 7/2002 | Gupta et al. | .................. | 709/206 |
| 2002/0107930 A1 * | 8/2002 | Itoh | ............................... | 709/206 |
| 2004/0054733 A1 * | 3/2004 | Weeks | .......................... | 709/206 |
| 2004/0083270 A1 * | 4/2004 | Heckerman et al. | .......... | 709/207 |
| 2005/0010645 A1 * | 1/2005 | Arshi et al. | ................... | 709/207 |
| 2008/0109736 A1 * | 5/2008 | Itoh | ............................... | 715/752 |

FOREIGN PATENT DOCUMENTS

JP     02-117239       5/1990  
JP     2002244972 A    8/2002

OTHER PUBLICATIONS

Blankinship, Erik, "E-mail List Equations to Create Specific Audiences," Cambridge, MA (2002), 2 pages.  
Japanese Office Action for corresponding Japanese Patent Application No. 2005-379777, Mar. 29, 2011, 3 pgs.

* cited by examiner

*Primary Examiner* — Brian P Whipple  
(74) *Attorney, Agent, or Firm* — Blakely, Sokoloff, Taylor & Zafman LLP

(57) ABSTRACT

A method and apparatus for sending messages to a list of members of a group with exceptions to one or more members of the group. In one embodiment, the method comprising creating an electronic mail (email) message having an email address corresponding to a group of email addresses and including a specification of one or more email addresses of the group that is not to be sent the email message, without knowledge of addresses of all members of the group, and sending the email message for delivery to a mail host for the group address.

14 Claims, 4 Drawing Sheets

Mail Client Exception Processing

Mail Server Exception Processing

MAIL LIST EXCEPTIONS

FIELD OF THE INVENTION

The present invention relates to the field of electronic mail delivery systems; more particularly, the present invention relates to electronic mail (email) systems in which an email list address representing addresses of a group may have exceptions specified so that one or more mail addresses from the group of members does not receive an email message addressed to the list address.

BACKGROUND OF THE INVENTION

Electronic mail (email) systems are not as old as the hills, but they are almost as old as multi-user computers. For almost as long, such systems have had a concept of group addresses, and delivering email to all members of a group. These group addresses are referred to herein as an mail list.

One typical problem with the use of an email list in such an email system is conveniently specifying exceptions to group addresses. That is, it is difficult to specify addresses in the group of addresses associated with the mail list to which an email message is not to be sent. It is a common occurrence, for instance, to wish to send out a message to every member of a group, except for one. The ordinary example is an announcement for a surprise birthday party.

There are a number of problems with providing a specification for an address form that includes the use of a mail list yet provides for exceptions. One problem is that membership of mail lists is not always made public. This is quite important in an age where junk e-mail is the most expensive component of electronic mail delivery. Many prior art email systems allow for specifying exceptions using forms of set arithmetic. That is, some prior art systems have implemented full Boolean algebra, including logical AND, OR, NOT, and XOR. These systems require knowledge of the members of all lists mentioned in order to work because their use requires bringing all the addresses on the mail list to a client and then perform all the processing. However, these systems cannot be guaranteed to work in the presence of partial set knowledge.

Another issue is that mail is subject to forwarding. This means that it is impossible to detect whether a given mail address points to one or more people. Detecting where an exception applies is a difficult problem. It is not generally possible to detect, by inference, the scope of an exception unless it is applied to a specific host and address.

Another issue is that mail addresses are ambiguous globally, but can be resolved within an given delivery scope. Each step of the mail delivery process invokes rewriting rules that transform mail addresses from one form to another. For example, mail addressed to simply "persons_name", when delivered through a local mail server, goes to a particular address, even though there are several other domains where the person holds that same local address.

Equally important is specifying proper behavior when an exception cannot be applied. In our birthday example, above, it would be disastrous if the party announcement went to the guest of honor, simply because an email address was withheld.

SUMMARY OF THE INVENTION

A method and apparatus for sending messages to a list of members of a group with exceptions to one or more members of the group. In one embodiment, the method comprising creating an electronic mail (email) message having an email address corresponding to a group of email addresses and including a specification of one or more email addresses of the group that is not to be sent the email message, without knowledge of addresses of all members of the group, and sending the email message for delivery to a mail host for the group address.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
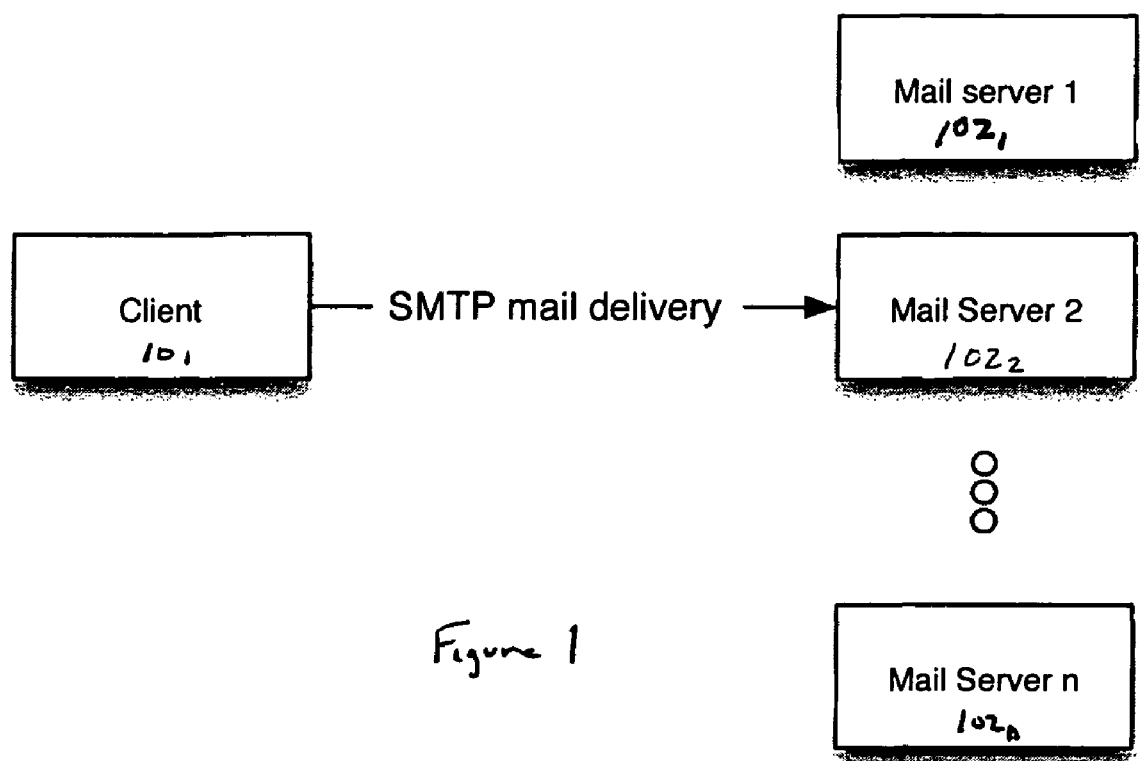
FIG. 1 illustrates a client and multiple mail servers between which the delivery of mail occurs.

A method and apparatus for utilizing mail list exceptions are described. Embodiments of the present invention facilitate the use of an email mail list that is associated with a group of one or more email addresses to enable an individual or entity to send an electronic mail message to the group of email addresses by only specifying a single address and be able to exclude certain addresses that are in the group of addresses from receiving the email message. Thus, if there is a mail list and an email system user desires to send an email address to all addresses in the group represented by the mail list except a subgroup of one or more email addresses, then the user can still do so without having to individually list all the email addresses from the mail list that the user desires to receive the email message. This is especially important where the user does not know all the email addresses in the mail list. Thus, in electronic mail systems in which a mail list may by configured to have exceptions specified so that one or more addresses of group members do not receive an electronic mail message addressed to the mail list.

In one embodiment, if the mail server receiving the email message with the exceptions checks to determine if the exceptions are part of the mail list. If they are all part of the mail list, then the mail server sends the email message to only those email addresses that are in the mail list and haven't been excepted out. If not, then the mail server replies with an error message and sends messages to no recipients. This is important because it is possible that a user simply misspelled one of the email addresses that is to be excepted out and it would not be desirable for the email message to be sent to an address that the user did not intend to receive the email message simply due to the misspelling.

In one embodiment, the semantics of the email address for the mail list includes characters along with the email addresses to which the user does not want the email message sent. The modifications are such that an ordinary mail system, upon encountering an email message addressed in this manner issues an error message because it is not an acceptable address, while an email system that is configured to recognize this type of email address may process it. Thus, only the specific mail server with semantics defined by the owner of the mail list is able to understand the address and process the email message.

In one embodiment, the email system includes a set of requirements for specifying exceptions to email. First, the email system fails to deliver to any list memory if one of the specified exceptions cannot be met. Second, the email system unambiguously specifies precisely the addresses to which exception apply. Third, the email system allows list membership information to remain private to the list manager. That is, the email system does not require global knowledge of the e-mail addresses of all group members. Thus, an email system is set forth herein for delivering email messages that provides for specifying exceptions to group addresses, scoped to particular deliver hosts, and includes specific processing rules for handling various error conditions.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In one embodiment, the techniques set forth herein may be performed on the client or mail server. To utilize the techniques, the client creates an electronic mail (email) message having an email list address that includes a specification of one or more email addresses of the group of addresses associated with the mail list that are not to be sent the email message, without knowledge of addresses of all members of the group. The email message is subsequently sent for delivery to a mail host for the group address. The client creates the email message by adding a sequence of characters and the one or more addresses that are not to receive the email message after the domain name of the email address.

In one embodiemnt, the following system was derived. A normal email address has the form:

local_part@domain where "local_part" is typically a user specific identifier, and "domain" is a DNS name for some Internet domain. In one embodiment, the following syntax is used local_part@domain-[exception,exception . . . ]

where each exception is a valid address, optionally including domain information. In one embodiment, an exception includes an address which itself specifies exceptions. So, for example, a message to all of CRC, except the Shared Media Group, although user "piersol" is allowed to see the message, might be specified:

crc@rii.ricoh.com-[smg@crc.ricoh.com-[piersol]]example #1

This syntax is compatible with the existing Internet mail RFCs, yet can be easily and unambiguously be detected as a mail address that includes exceptions. Note that this type of address will fail immediately if the email with the address exceptions is delivered to a system that does not understand exceptions.

Mail client programs usually deliver their mail through a server program known as a mail transfer agent, although a client might perform this service itself. Mail transfer agents find the correct server for mail to be delivered, and try and retry sending the message until it either succeeds or a time limit is reached.

Each address with exceptions is delivered to the proper mail host for the address specified by everything leading up to the "-[" character sequence. The host either understands exceptions, or not. If the mail transfer-agent does not understand exceptions in addresses, delivery immediately fails. If it does understand exceptions, the mail transfer agent searches for the sequence of characters that appear in the email address, obtains a mail server address using the domain name, and delivers the email address with the one or more addresses that are not to receive the email message to the mail server.

The mail host checks the complete list of exceptions, and fails if any of them are not understood. In both cases, failure involves sending a notification to sender. In one embodiment, the client may receive an error message if at least one of the one or more addresses is not in the group of email addresses.

With respect to the mail server, the mail server receives the electronic mail (email) message having a mail list address that specifies one or more email addresses of the group associated with the mail list that is not to be sent the email message and forwards the email message to all email addresses in the group except these email addresses of the exceptions if the one or more addresses are in the group of email addresses. In one embodiment, the mail server sends an error message if any one of the exception addresses is not in the email addresses associated with the list.

Figure 2:
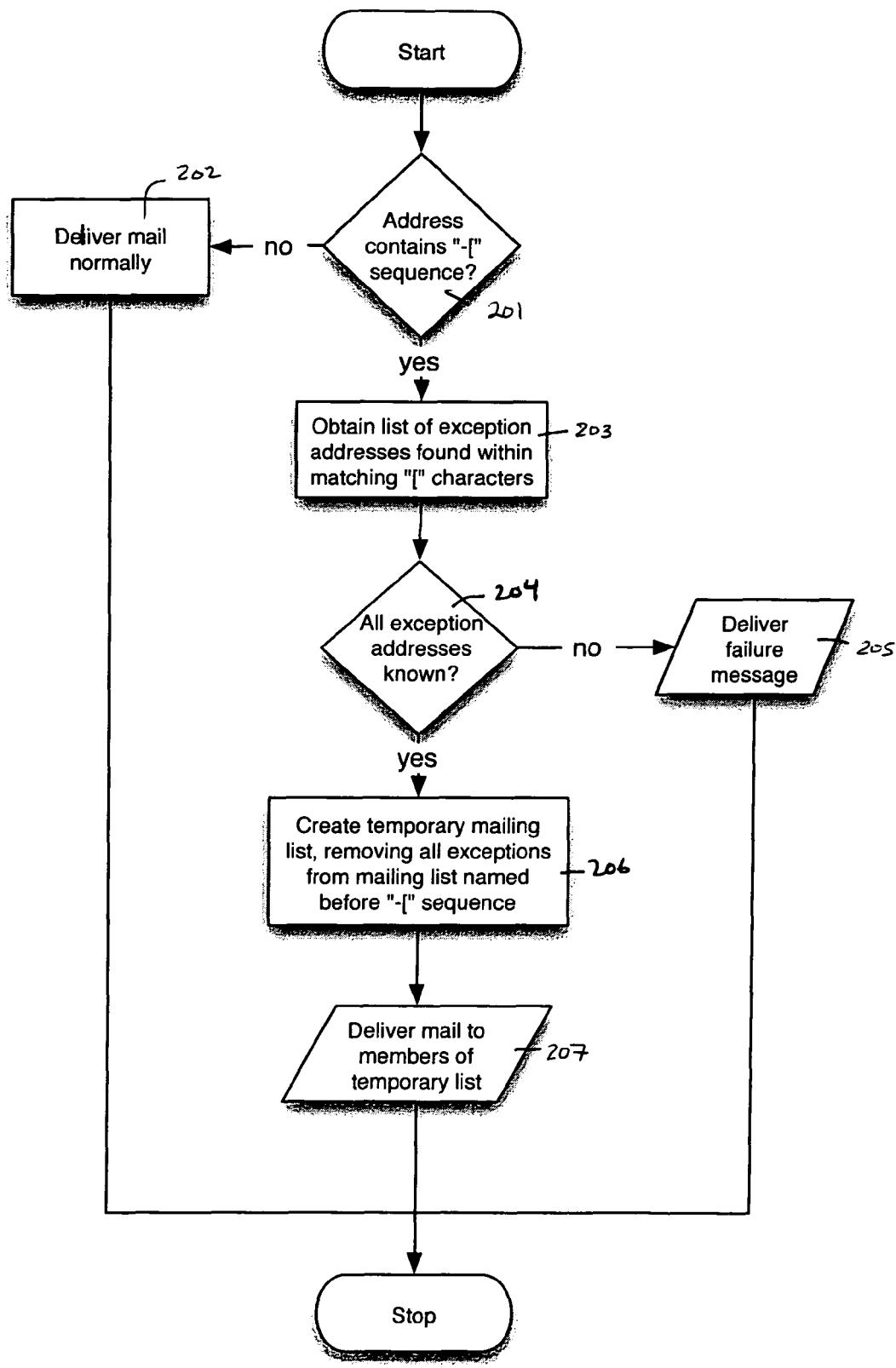
FIG. 2 is a flowchart diagram of one embodiment of exception processing performed by a mail server.
Figure 3:
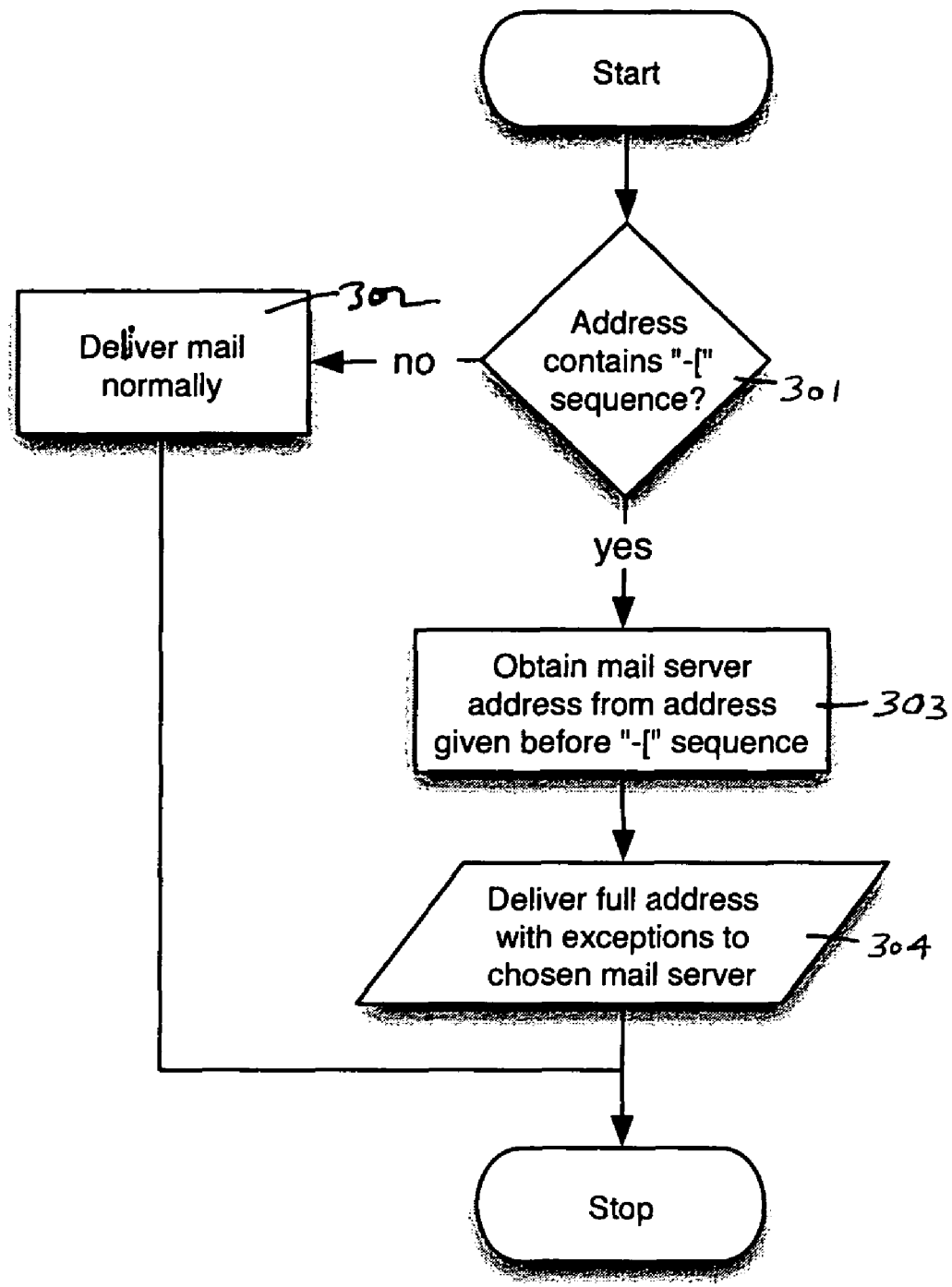
FIG. 3 is a flow diagram of one embodiment of exception processing performed by mail client.

In one embodiment, the mail server processes the email message by determining whether the sequence of characters appears in the email address. If the sequence of characters appears in the email address, then the mail server obtains the one or more addresses from the email address, determines whether the one or more addresses are in the group of email addresses, and creates a temporary list of one or more email addresses that are to receive the email message and sending the email message to email addresses in the temporary list if the one or more addresses are in the group of email addresses. FIGS. 1-3 described below illustrate exemplary processing of one embodiment of an email system.

FIG. 1 illustrates one embodiment of an electronic mail (email) system. Referring to FIG. 1, client 101 and mail servers $102_{1-N}$ exchange mail. In one embodiment, the mail is exchanged between client 101 and mail servers $102_{1-N}$ via SMTP mail delivery.

FIG. 2 is a flowchart diagram of one embodiment of exception processing performed by a mail server. The process is performed by processing logic, which may comprise hardware (e.g., circuitry, dedicated logic, etc.), software (such as is run on a general purpose computer system or a dedicated machine), or a combination of both.

Referring to FIG. 2, the process begins by processing logic determining whether the address contains a predetermined sequence of characters (processing block 201). In one embodiment, the predetermined sequence of characters is "-[". If not, processing transition to processing block 202 where processing logic delivers the email normally, and then the process ends.

If the address does contain the predetermined character sequence, processing logic obtains a list of exception addresses (processing block 203). In one embodiment, processing logic obtains the list of exception addresses by locating the matching open bracket ("[") and close bracket ("]") characters and extracting the email addresses therebetween.

Next, processing logic tests whether all the exception addresses are known to the mail server as being part of the group list specified in the email address (processing block 204). If not, processing logic delivers a failure message (processing block 205) and the process ends. Thus, in such a case, the email message is not delivered to any member having an address in the group.

If all of the exception addresses are known to the mail server as being part of the group list specified in the email address, processing logic creates a temporary mailing list by removing all exceptions from the mailing list named before the predetermined character sequence (e.g., "-[") (processing block 206) and delivers the mail to the members of the temporary list (processing block 207). Thereafter, the process ends.

FIG. 3 is a flow diagram of one embodiment of exception processing performed by mail client. The process performed by processing logic, which may comprise hardware (e.g., circuitry, dedicated logic, etc.), software (such as is run on a general purpose computer system or a dedicated machine), or a combination of both.

Referring to FIG. 3, the process begins by processing logic determining whether the address contains a predetermined character sequence (processing block 301). In one embodiment, the predetermined character sequence comprises "-[". If not, processing logic delivers the email message in the traditional fashion (processing block 302) and the process ends. If the address does contain the predetermined character sequence, processing logic obtains a mail server address from the address given before the predetermined character sequence (e.g., "-[") (processing block 303) and delivers the full address with extensions to the chosen mail server (processing block 304). Thereafter, the process ends.

Therefore, using the techniques described herein the actual membership of lists remains private to the mail systems. A determined attacker can find out whether a particular address is a list member, but cannot divine the address from knowing the list name. He must know both the name of a list and the name of a user to attempt such a determination. This means that junk emailers cannot access such information through this system.

It is an important characteristic of one embodiment of the email system that an exception has unambiguous scope. This allows proper failure notification. Consider, for example, an implementation based on set logic, without scooping. This would look something like:

crc@rii.ricoh.com-(smg@crc.ricoh.com-piersol) example #2

This is logically equivalent to example #1 in terms of the set of recipients. However, it is not clear from this expression which list is expected to supply knowledge of the ambiguous address 'piersol'. It might be a global list, it might be known to the owner of crc@rii.ricoh.com or the owner of smg@crc.ricoh.com. Boolean algebra is expressive with respect to the order of operations, but not the scope of exception conditions. Without this added information, error conditions cannot be correctly handled. In example #1 given above, the mailer at rii.ricoh.com (not crc.ricoh.com) is expected to understand the addresses specified.

In contrast to some prior art systems that have implemented full Boolean algebra, including logical AND, OR, NOT, and XOR, embodiments of the present invention does not require knowledge of the members of all lists mentioned in order to operate and does not implement full Boolean logic.

An Exemplary Computer System

Figure 4:
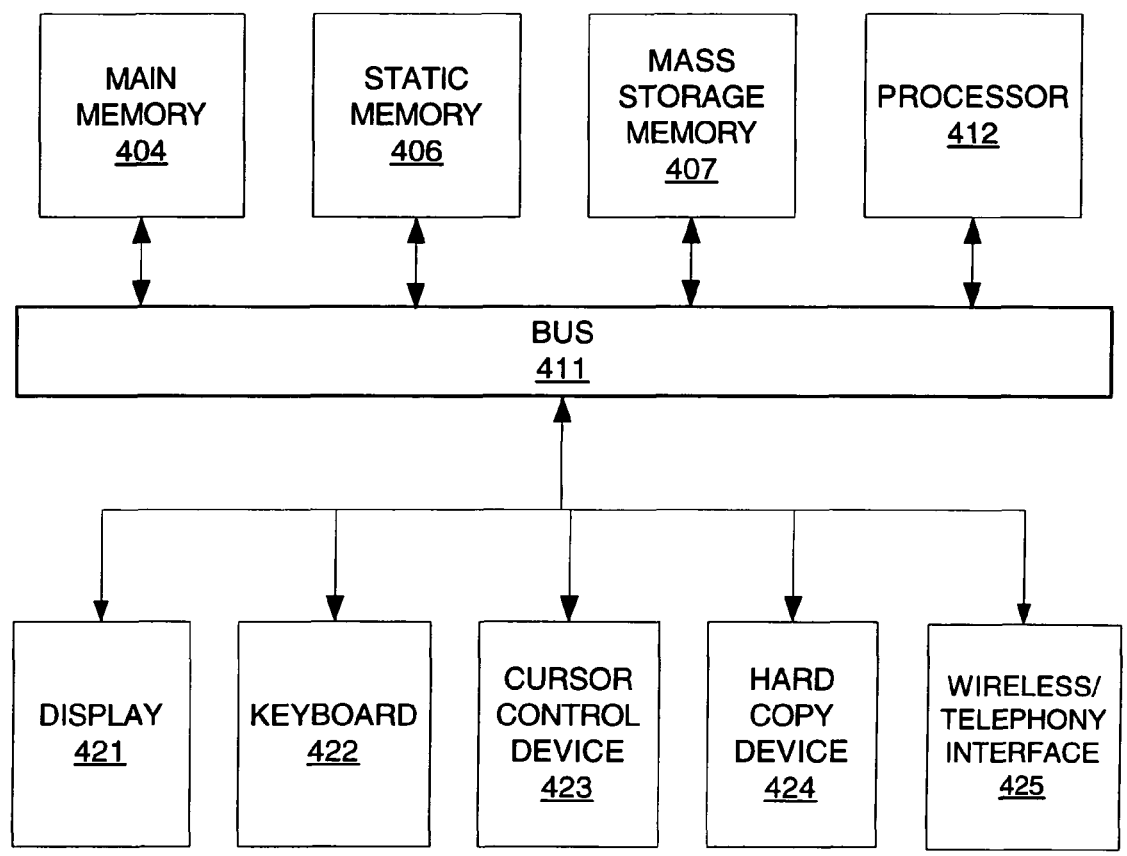
FIG. 4 is a block diagram of an exemplary computer system that may perform one or more of the operations described herein.

FIG. 4 is a block diagram of an exemplary computer system that may perform one or more of the operations described herein. Referring to FIG. 4, computer system 400 may comprise an exemplary mail client or mail server computer system. Computer system 400 comprises a communication mechanism or bus 411 for communicating information, and a processor 2712 coupled with bus 2711 for processing information. Processor 412 includes a microprocessor, but is not limited to a microprocessor, such as, for example, Pentium™, PowerPC™, etc.

System 400 further comprises a random access memory (RAM), or other dynamic storage device 404 (referred to as main memory) coupled to bus 411 for storing information and instructions to be executed by processor 412. Main memory 404 also may be used for storing temporary variables or other intermediate information during execution of instructions by processor 412.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Data storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, trackpad, stylus, or cursor direction keys, coupled to bus 411 for communicating direction information and command selections to processor 412, and for controlling cursor movement on display 421.

Another device that may be coupled to bus 411 is hard copy device 424, which may be used for printing instructions, data, or other information on a medium such as paper, film, or similar types of media. Furthermore, a sound recording and playback device, such as a speaker and/or microphone may optionally be coupled to bus 411 for audio interfacing with computer system 400. Another device that may be coupled to bus 411 is a wired/wireless communication capability 425 to communication to a phone or handheld palm device.

Note that any or all of the components of system 400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in them recite only those features regarded as essential to the invention.

We claim:

1. A method comprising:
    creating an electronic mail (email) message having an email address corresponding to a group of email addresses, the email address including an exception demarcated by a sequence of two or more characters after the domain name of the email address, wherein the exception specifies one or more email addresses of the group after the sequence of two or more characters that is not to be sent the email message, the exception created without access to a list of addresses of all members of the group,
    wherein the exception includes a second email address corresponding to a second group of email addresses, the second email address followed by a second exception demarcated by the sequence of two or more characters after the domain name of the second email address, wherein the second exception specifies at least one email address that is to be exempt from the exception; and
    sending the email message addressed to the email address, corresponding to the group of email addresses, with the exception to a mail host without inclusion of addresses of members of the group not specified by the exception.

2. The method defined in claim 1 further comprising receiving an error message if at least one of the one or more addresses specified in the exception is not in the group of email addresses.

3. The method defined in claim 1 further comprising:
    determining whether the sequence of characters appears in the email address;
    obtaining a mail server address using the domain name; and
    delivering the email address with the one or more addresses to the mail server.

4. A non-transitory article of manufacture having one or more recordable media storing instructions thereon which, when executed by a system, cause the system to perform a method comprising:
    creating an electronic mail (email) message having an email address corresponding to a group of email addresses, the email address including an exception demarcated by a sequence of two or more characters after the domain name of the email address, wherein the exception specifies one or more email addresses of the group after the sequence of two or more characters that is not to be sent the email message, the exception created without access to a list of addresses of all members of the group,
    wherein the exception includes a second email address corresponding to a second group of email addresses, the second email address followed by a second exception demarcated by the sequence of two or more characters after the domain name of the second email address, wherein the second exception specifies at least one email address that is to be exempt from the exception;
    sending the email message addressed to the email address, corresponding to the group of email addresses, with the exception to a mail host without inclusion of addresses of members of the group not specified by the exception.

5. The article of manufacture defined in claim 4 wherein the method further comprises receiving an error message if at least one of the one or more addresses specified in the exception is not in the group of email addresses.

6. The article of manufacture defined in claim 4 wherein the method further comprises:
    determining whether the sequence of characters appears in the email address;
    obtaining a mail server address using the domain name; and
    delivering the email address with the one or more addresses to the mail server.

7. A method comprising:
    receiving an electronic mail (email) message having an email address corresponding to a group of email addresses, the email address including an exception demarcated by a sequence of two or more characters after the domain name of the email address, wherein the exception specifies one or more email addresses of the group after the sequence of two or more characters that is not to be sent the email message without inclusion of addresses of members of the group not specified by the exception, the exception created without access to a list of addresses of all members of the group,
    wherein the exception includes a second email address corresponding to a second group of email addresses, the second email address followed by a second exception demarcated by the sequence of two or more characters after the domain name of the second email address, wherein the second exception specifies at least one email address that is to be exempt from the exception; and forwarding the email message to all email addresses in the group except the one or more email addresses if the one or more addresses are in the group of email addresses.

8. The method defined in claim 7 further comprising sending an error message if at least one of the one or more addresses is not in the group of email addresses.

9. The method defined in claim 7 further comprising:
  determining whether the sequence of characters appears in the email address;
  if the sequence of characters appears in the email address, then
    obtaining the one or more addresses from the email address;
    determining whether the one or more addresses are in the group of email addresses; and
  creating a temporary list of one or more email addresses that are to receive the email message and sending the email message to email addresses in the temporary list if the one or more addresses are in the group of email addresses.

10. The method defined in claim 9 further comprising sending an error message if at least one of the one or more addresses is not in the group of email addresses.

11. A non-transitory article of manufacture having one or more recordable media storing instructions thereon which, when executed by a system, cause the system to perform a method comprising:
  receiving an electronic mail (email) message having an email address corresponding to a group of email addresses, the email address including an exception demarcated by a sequence of two or more characters after the domain name of the email address, wherein the exception specifies one or more email addresses of the group after the sequence of two or more characters that is not to be sent the email message without inclusion of addresses of members of the group not specified by the exception, the exception created without access to a list of addresses of all members of the group,
  wherein the exception includes a second email address corresponding to a second group of email addresses, the second email address followed by a second exception demarcated by the sequence of two or more characters after the domain name of the second email address, wherein the second exception specifies at least one email address that is to be exempt from the exception;
  forwarding the email message to all email addresses in the group except the one or more email addresses if the one or more addresses are in the group of email addresses.

12. The article of manufacture defined in claim 11 wherein the method further comprises sending an error message if at least one of the one or more addresses is not in the group of email addresses.

13. The article of manufacture defined in claim 11 wherein the method further comprises:
  determining whether the sequence of characters appears in the email address;
  if the sequence of characters appears in the email address, then
    obtaining the one or more addresses from the email address;
    determining whether the one or more addresses are in the group of email addresses; and
  creating a temporary list of one or more email addresses that are to receive the email message and sending the email message to email addresses in the temporary list if the one or more addresses are in the group of email addresses.

14. The article of manufacture defined in claim 13 wherein the method further comprises sending an error message if at least one of the one or more addresses is not in the group of email addresses.

* * * * *